Oct. 20, 1970 T. L. HUGHES 3,535,171
HIGH VOLTAGE n-p-n TRANSISTORS
Filed March 7, 1968
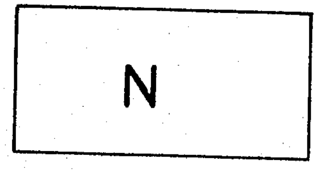
1.
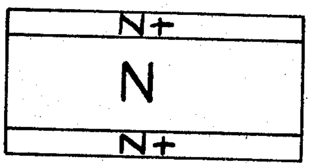
2.
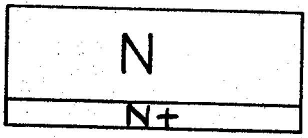
3.
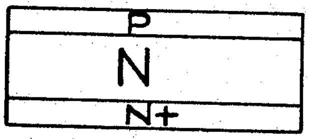
4.
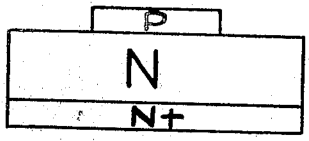
5.
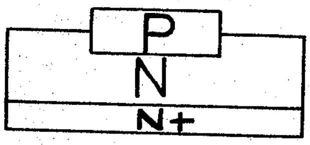
6.
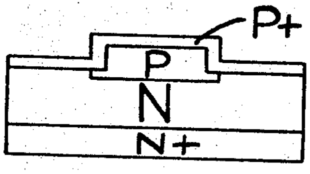
7.
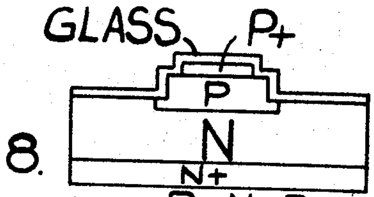
8.
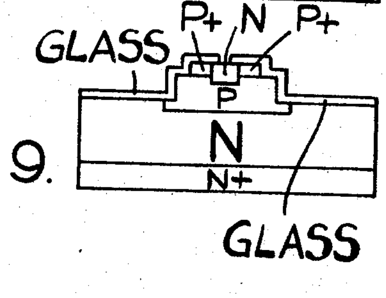
9.
INVENTOR
T. L. Hughes
BY Wenrock, Dunning & Seebohm
ATTORNEYS 3,535,171

HIGH VOLTAGE n-p-n TRANSISTORS

Thomas Lawrence Hughes, Birmingham, England, assignor to Joseph Lucas (Industries) Limited, Birmingham, England Filed Mar. 7, 1968, Ser. No. 711,446
Claims priority, application Great Britain, Apr. 11, 1967, 16,543/67
Int. Cl. H01l 7/44
U.S. Cl. 148—190 1 Claim

ABSTRACT OF THE DISCLOSURE

In the manufacture of a high voltage n-p-n transistor, aluminium is diffused into one face of an n-type silicon slice, part of the aluminium layer thus formed is removed, the aluminium is allowed to diffuse further in oxidizing atmosphere at an elevated temperature, the p-type layer formed by the aluminium is covered with an insulating form in which a window is formed, whereafter an n-type layer is formed within the p-type aluminium layer to constitute the emitter of the transistor.

This invention relates to a method of manufacturing high voltage n-p-n transistors, (i.e.) transistors which have a high collector base breakdown voltage in the region of hundreds of volts.

A method according to the invention comprises the following steps:

(i) diffusing aluminium into one face of an n-type silicon slice which is to act as the collector of the transistor,
(ii) removing part of the aluminium layer formed at stages (i) to leave a p-type layer which is to act as the base of the transistor,
(iii) allowing diffusion of the aluminium to continue in an oxidising atmosphere at an elevated temperature to change the concentration profile of the aluminium in said p-type layer and so increase the collector-base breakdown voltage,
(iv) diffusing a p-type impurity into said one face of the slice,
(v) removing said p-type layer from the collector layer and the collector-base junction,
(vi) covering said p-type layer with an insulating film and diffusing an n-type impurity through a hole in said film to form within said p-type layer an n-type layer which is to act as the emitter of the transistor,
(vii) making contacts to the base, emitter and collector.

It will be appreciated that the method can, and in the preferred embodiment will, include further steps.

The invention further resides in a transistor formed by the method specified.

The accompanying drawing is a flow sheet illustrating one example of the invention, the various steps illustrated being numbered to accord with the stage numbers in the following description. The drawing is highly diagrammatic, and the various regions of the slice are not drawn to scale. Glass layers formed at various stages and then removed are not shown.

STAGE 1

A slice of n-type silicon having a resistivity of 25 ohm-cms. is cut 0.012 inch thick.

STAGE 2

The slice is placed in a furnace at 1300° C. and phosphorus is diffused into the slice for 10 minutes. The phosphorus source is then removed and the slice is left in the furnace at 1300° C. for 16 hours, after which the furnace is allowed to cool slowly. This stage produces highly concentrated n+ layers in the slice.

STAGE 3

The diffused n+ layer is removed from the top surface (as drawn) of the slice either by etching or lapping and polishing. The slice is now 0.0055 inch thick with an n+ layer 0.0027 inch thick on its lower surface. The n+ layer is highly concentrated, and is substantially unaffected by the remaining stages of the process, and so it will not be mentioned again.

STAGE 4

The slice is cleaned and aluminium is diffused into the slice without significant heating of the slice. For this purpose the slice is placed in the cold part of a furnace which is evacuated to a pressure less than $1.0 \times 10^{-4}$ mms. Hg. The slice and the source of aluminium are then moved to the central hot part of the furnace at 1100° C. for 30 minutes, after which the aluminium is moved to a cold part of the furnace so that the aluminium no longer vaporises. This stage produces a p-type layer in the upper surface of the slice. After a delay of 5 minutes, which ensures that the aluminium source has cooled sufficiently to take no further part in the process, air or other oxidising atmosphere is admitted to the furnace and diffusion is allowed to continue for 5 minutes, after which the slice is removed from the furnace.

STAGE 5

Part of the aluminium diffused layer is removed by conventional photomasking and etching techniques. The mask is removed and the glass layers on the silicon is removed with hydrofluoric acid. The slice now has an n-type region which is to act as the collector, and a p-type region in the n-type region and which later becomes the base.

STAGE 6

The slice is placed in a furnace at 1200° C. in an oxidising atmosphere for 8 hours, and then cooled slowly. The effect of diffusing the aluminium further into the slice in an oxidising atmosphere is to alter the concentration profile of the aluminium so that the greatest concentration of aluminium occurs below the surface, and the gradient is made considerably shallower at the collector-based junction. It is primarily the shallow gradient which gives the transistor to be made a high collector-base breakdown voltage.

STAGE 7

The glass produced at stage 6 is removed from the slice with hydrofluoric acid and the slice is cleaned and placed in a furnace at 1050° C. Boron is diffused into the slice from a source of boron-trichloride for 5 minutes and the furnace is then purged with nitrogen for 10 minutes.

STAGE 8

The boron deposited at stage 7 is removed from the n-type layer by photomasking and etching, and the slice is then oxidised in an atmosphere of wet oxygen at 1200° C. for 10 minutes to produce a glass layer over the slice.

STAGE 9

A window is formed in the glass layer at a position wholly within the p-type layer. The slice is then placed in a furnace at 1150° C. and phosphorus is diffused into the slice from a source of phosphorus oxychloride for 5 minutes in an atmosphere or nitrogen containing 2 to 5% oxygen. By virtue of the glass layer, the only effective diffusion of phosphorus is through the window.

STAGE 10 (NOT SHOWN)

The slice is placed in a quartz tube at 1200° C. for 30 minutes, and wet oxygen is passed through the tube. The slice is then allowed to cool slowly. This stage allows the aluminium to diffuse further into the slice to thicken the base, the phosphorus to diffuse into the base to form the emitter, and the boron to diffuse into the base to form a concentrated p-type layer in the surface of the base.

STAGE 11 (NOT SHOWN)

Contacts are made to the base, emitter and collector. These contacts may all be made to the upper surface if desired.

Having thus described my invention what I claim as new and desire to secure by Letters Patent is:

1. A method of manufacturing a high voltage n-p-n transistor, comprising the following steps:

(i) diffusing aluminium into one face of an n-type silicon slice which is to act as the collector of the transistor, (ii) removing part of the aluminium layer formed at stage (i) to leave a p-type layer which is to act as the base of the transistor, (iii) allowing diffusion of the aluminium to continue in an oxidising atmosphere at an elevated temperature to change the concentration profile of the aluminimum in said p-type layer and so increase the collector-base breakdown voltage, (iv) diffusing a p-type impurity into said one face of the slice, (v) removing said p-type layer from the collector layer and the collector-base junction, (vi) covering said base layer and the base-collector junction with an insulating film and diffusing an n-type impurity through a hole in said film to form within said base layer an n-type layer which is to act as the emitter of the transistor, (vii) making contacts to the base, emitter and collector.

References Cited

UNITED STATES PATENTS

| | | | |
|---|---|---|---|
| 3,210,225 | 10/1965 | Brixey | 148—190 |
| 3,249,831 | 5/1966 | New et al. | 148—190 |

L. DEWAYNE RUTLEDGE, Primary Examiner

R. A. LESTER, Assistant Examiner

U.S. Cl. X.R.

29—580; 148—186, 187